(12) United States Patent
Soriano et al.

(10) Patent No.: US 12,254,223 B2
(45) Date of Patent: Mar. 18, 2025

(54) METHOD AND SYSTEM FOR ASSISTING A USER WITH OPERATION OF MULTIFUNCTION PRINTER USING MOBILE DEVICE

(71) Applicant: Konica Minolta Business Solutions U.S.A., Inc., Ramsey, NJ (US)

(72) Inventors: Randy Cruz Soriano, San Leandro, CA (US); Subramanyam Badri, Livermore, CA (US)

(73) Assignee: Konica Minolta Business Solutions U.S.A., Inc., Ramsey, NJ (US)

(*) Notice: Subject to any disclaimer, the term of this patent is extended or adjusted under 35 U.S.C. 154(b) by 0 days.

(21) Appl. No.: 18/344,163

(22) Filed: Jun. 29, 2023

(65) Prior Publication Data

US 2025/0004671 A1    Jan. 2, 2025

(51) Int. Cl.
*G06F 3/12* (2006.01)
*G06F 21/32* (2013.01)
*G06K 7/14* (2006.01)

(52) U.S. Cl.
CPC .......... *G06F 3/1203* (2013.01); *G06F 3/1229* (2013.01); *G06F 3/1292* (2013.01); *G06F 21/32* (2013.01); *G06K 7/1417* (2013.01)

(58) Field of Classification Search
CPC .... G06F 3/1203; G06F 3/1229; G06F 3/1292; G06F 21/32; G06K 7/1417
See application file for complete search history.

(56) References Cited

U.S. PATENT DOCUMENTS

| | | | |
|---|---|---|---|
| 9,930,200 B2 * | 3/2018 | Kubota | H04N 1/00949 |
| 11,150,850 B1 * | 10/2021 | Caño | G06F 3/1238 |
| 2011/0037995 A1 * | 2/2011 | Wang | G06F 3/1205 |
| | | | 358/1.15 |
| 2011/0126270 A1 * | 5/2011 | Sato | G06F 21/608 |
| | | | 726/4 |
| 2013/0169996 A1 * | 7/2013 | McLeod | G06F 3/1205 |
| | | | 358/3.28 |
| 2014/0036299 A1 * | 2/2014 | Norota | G06F 3/121 |
| | | | 358/1.14 |
| 2017/0099397 A1 * | 4/2017 | Ishido | H04N 1/00087 |
| 2018/0192618 A1 * | 7/2018 | Samad | G06F 16/00 |
| 2020/0183628 A1 * | 6/2020 | Boo | G06F 3/1238 |
| 2020/0225885 A1 * | 7/2020 | Akimoto | G06F 3/121 |
| 2021/0281572 A1 * | 9/2021 | Fernandez-Spadaro | |
| | | | H04L 63/083 |
| 2022/0122724 A1 * | 4/2022 | Durlach | G16H 10/60 |
| 2022/0283761 A1 * | 9/2022 | Shrestha | G06F 3/1205 |

(Continued)

*Primary Examiner* — Juan M Guillermety
(74) *Attorney, Agent, or Firm* — Buchanan Ingersoll & Rooney PC

(57) ABSTRACT

A method, a non-transitory computer readable medium, and a multifunction peripheral or multifunction printer that includes a method of operating a multifunction printer. The method includes receiving, by the multifunction printer, a selection of a function of the multifunction printer; displaying, on a display panel of the multifunction printer, a code for the selection of the function of the multifunction printer; receiving, by the multifunction printer, a request for operating assistance for the function of the multifunction printer based on the displayed code from the client device; and sending, by the multifunction printer, the operating assistance to the client device of the user on the function of the multifunction printer.

20 Claims, 12 Drawing Sheets

(56) References Cited

U.S. PATENT DOCUMENTS

| | | | |
|---|---|---|---|
| 2023/0244426 A1* | 8/2023 | Kitahashi | G06F 3/1222 358/1.14 |
| 2023/0266932 A1* | 8/2023 | Onishi | G06F 3/1204 358/1.15 |

* cited by examiner

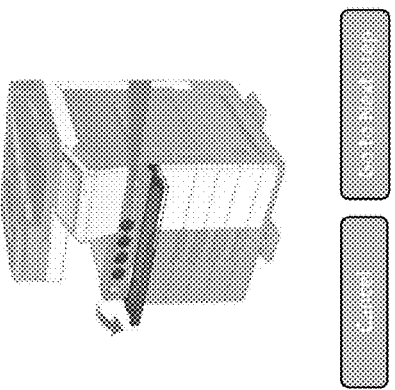
FIG. 4A
FIG. 4B

METHOD AND SYSTEM FOR ASSISTING A USER WITH OPERATION OF MULTIFUNCTION PRINTER USING MOBILE DEVICE

FIELD OF THE DISCLOSURE

The present disclosure generally relates to a method and system for operation of a multifunction printer (MFP) using a mobile device, and more particularly, to a method and system for operating a multifunction printer using a mobile device that guides a user through a step by step process.

BACKGROUND

Most multifunction printers (MFPs) provides several features, which require one or more steps to perform routine processes or functions such as making copies, scanning, faxing, duplex printing, color printing, etc. It is more difficult especially to a user using a multifunction printer, for example, a newly installed multifunction printer in an office for the first time to be aware of the necessary steps to execute the functions of the multifunction printer.

Accordingly, it would be desirable if there is multifunction printer (MFP) operation that can be accessible using a mobile device that helps guide users through the operations on a step by step basis.

SUMMARY

In consideration of the above issues, it would be desirable to allow a user using mobile device to retrieve a self-guided directions for each of a plurality of multifunction printers (MFPs) that can be easily retrieved, for example, via a quick response (QR) code.

In accordance with one aspect, a method of operating a multifunction printer, the method comprising: receiving, by the multifunction printer, a selection of a function of the multifunction printer; displaying, on a display panel of the multifunction printer, a code for the selection of the function of the multifunction printer; receiving, by the multifunction printer, a request for operating assistance for the function of the multifunction printer based on the displayed code from the client device; and sending, by the multifunction printer, the operating assistance to the client device of the user on the function of the multifunction printer.

In accordance with another aspect, a non-transitory computer-readable medium having program instructions embodied therewith, the program instructions executable by a computer to cause the computer to perform a process comprising: receiving, by a multifunction printer, a selection of a function of the multifunction printer; displaying, on a display panel of the multifunction printer, a code for the selection of the function of the multifunction printer; receiving, by the multifunction printer, a request for operating assistance for the function of the multifunction printer based on the displayed code from the client device; and sending, by the multifunction printer, the operating assistance to the client device of the user on the function of the multifunction printer.

In accordance with a further aspect, a multifunction printer comprising: a display panel; and a processor configured to: receive a selection of a function of the multifunction printer; display on the display panel of the multifunction printer, a code for the selection of the function of the multifunction printer; receive a request for operating assistance for the function of the multifunction printer based on the displayed code from the client device; and send the operating assistance to the client device of the user on the function of the multifunction printer.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 4A-4D are illustrations of a display of a mobile device with a maintenance assistant in accordance with an exemplary embodiment.

DETAILED DESCRIPTION

Figure 1:
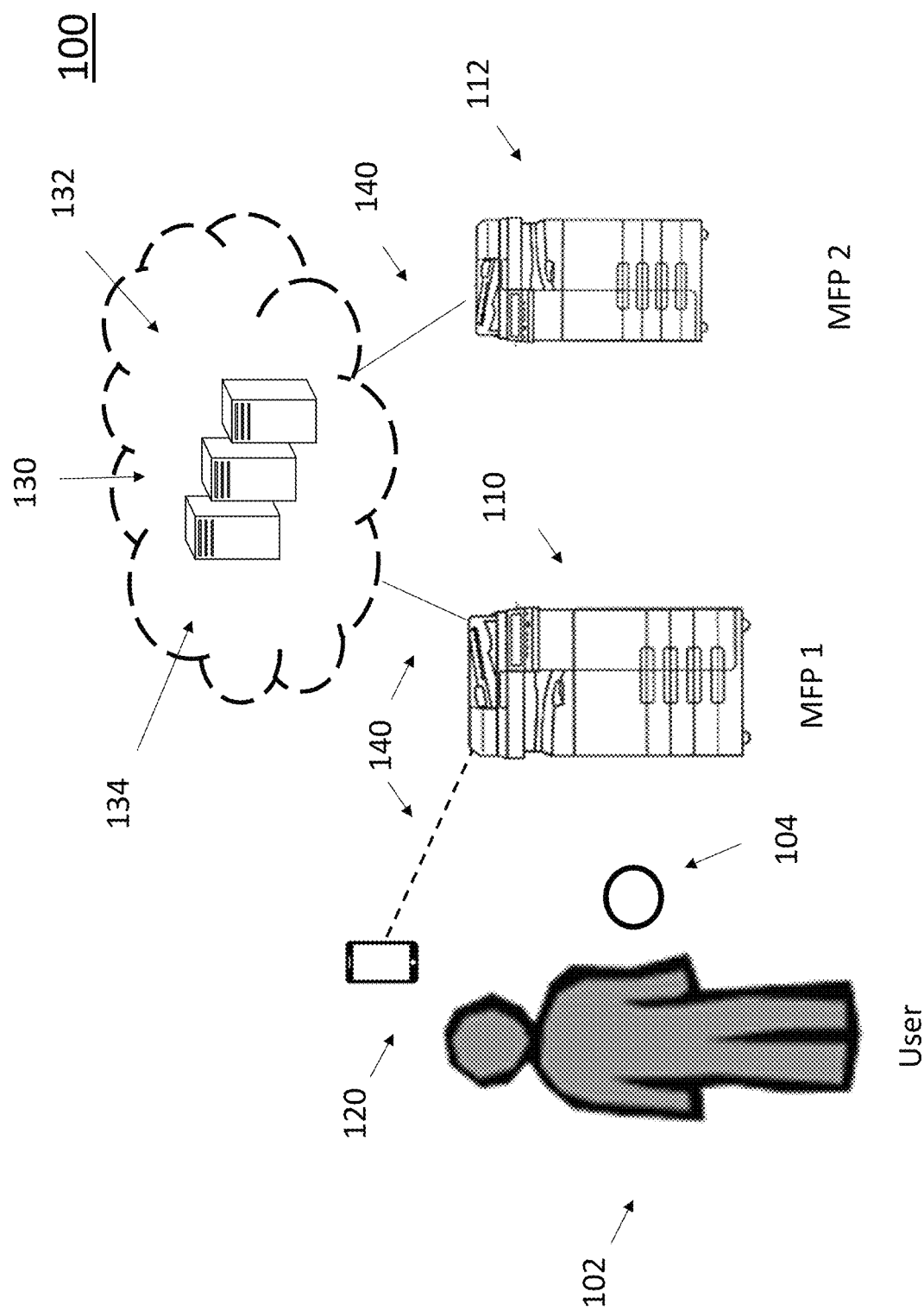
FIG. 1 is an illustration of a system for operation of multifunction printers (MFPs) using a mobile device for guidance in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Multifunction peripherals or multifunction printers (MFP) often require users to login so that the managed print services can be implemented. The managed print services can include, for example, user authentication that control identities of users, which can help ensure that users have been authenticated at the MFP before a print job is released and/or printed. In addition, managed print services allow administrators to track and monitor usage in real time through regular, scheduled and on-demand reporting, management and charge back of costs by assigning users to cost centers, entering of billing or project codes before printing a document. Managed print services can also create print rules or policies, which can help ensure, for example, cost management by allowing different user roles to access different devices and features. For example, duplex printing and/or color printing may be allowed by certain individuals and/or groups and not permitted to other individuals and/or groups.

In addition, depending on the user level access to the managed print services, some of the regular operations, which a user may perform regularly, for example, making copies with booklet binding, stapling, printing a color cover page with black and white inside pages, scanning to a PDF file, and sending to email group, may not be the same on each and every multifunction printer. In accordance with an embodiment, the method and system for operating a multifunction printer using a mobile device can provide a self-guided directions for each of a plurality of multifunction printers (MFPs) that can be rather easily retrieved, for example, via a two-dimensional barcode, such as quick response (QR) code.

In accordance with a further embodiment, the method and system for operating a multifunction printer using a mobile device can also be configured to save the operation task (i.e., saved settings) to a mobile device of a user, which can be used again to the same or another multifunction printer in the system. In addition, the saved settings can be exported to another mobile device and alternatively, the saved pre-set settings can be imported from another mobile device to a multifunction printer for use in executing the same operation task.

In accordance with another embodiment, when there is a task that requires maintenance service that the user is not familiar with and needs attention, for example, replacing consumables like toners, papers, staples, etc., or parts like imaging drum unit, imaging transfer belt, the task may require administrators/service personnel level access to perform and the method and system can allow the administrators/service personnel can view the operation guide on the mobile device.

FIG. 1 is an illustration of a system 100 for a system for operation of multifunction printers (MFPs) 110, 112, using a mobile device 120 for guidance in accordance with an exemplary embodiment. As shown in FIG. 1, the system 100 can include one or more multifunction printers (MFP) 110, 112, a client device 120, and one or more computer systems 130. The system 100 can also include a user 102 that can be authenticated on the one or more multifunction printers 110, 112, and/or via the client device 120, for example, by entry of personal identification number, use of public key infrastructure (PKI) card, or via an authentication process using, for example, a biometric identifier or other authenticator of the user 102. In accordance with an embodiment, the client device 120 can be, for example, a mobile client, for example, a smart phone, a smart tablet, a smart watch. The authentication of the user 102 on the computer system 110 can be, for example, a FIDO authentication workflow for access to the multifunction peripheral or multifunction printer 110, 112, and managed print services that can be hosted on one or more computer systems 130. The one or more computer systems 130 can include one or more servers 132, the one or more servers 132 can be, for example, optionally running in a cloud computing environment that can be accessed on demand by the multifunction printers 110, 112.

The one or more multifunction printers 110, 112, and the client device 120 can include a processor or central processing unit (CPU), and one or more memories for storing software programs and data. The processor or CPU carries out the instructions of a computer program, which operates and/or controls at least a portion of the functionality of the one or more multifunction printers 110, 112, and the client device 120. The one or more multifunction printers 110, 112, and the client device 120 can also include an operating system (OS), which manages the computer hardware and provides common services for efficient execution of various software programs. For example, the software programs can include application software, for example, for managing an authentication module and/or biometric identifier, and/or printer driver software, for example, for one or more of the one or more multifunction printers 110, 112, and the client device 120, In accordance with an embodiment, the one or more multifunction peripheral or multifunction printer (MFP) 110, 112, can include at least a copy function, an image reading function, a facsimile (fax) function, and a printer function, and forms an image on a sheet based on a print job multifunction peripheral (print instruction) received, for example, from the client device 120 or a computer system 130. The multifunction peripheral or multifunction printer 112 can include a memory, which stores an identify of one or more users 102 that can be authenticated, for example, via a PIN, a PKI card, or an authentication process using, for example, biometric identifiers of the user 102.

In accordance with an embodiment, the one or more multifunction peripherals or multifunction printers (MFPs) 110, 112, and the one or more computer systems 130 can be configured to host, for example, managed print services (MPS) 134. The managed print services 134 can include, for example, one or more of user authentication, monitoring and reporting, user and cost management, cost accounting and budget management, printer queue management, and workflow management. For example, user authentication can include control over identities of user, which can help ensure that users have been authenticated at a device before a print job is released and/or printed. The monitoring and report features can allow administrators to track and monitor usage in real time through regular, scheduled and on-demand reporting. The user and cost management feature can help manage and charge back costs by assigning users to cost centers, or enabling them to select the relevant cost center, billing or project code before printing a document. In addition, the user and cost management feature can be used to create print rules or policies, which can help ensure tighter cost management by allowing different user roles to access different devices and features. For example, the user and cost management feature can control, for example, duplex printing and/or color printing to individuals and/or groups. In addition, cost accounting and budget management provides for cost control and flexibility, which can be used as a print management solution that allows administrators to assign print budgets to users, with the option to top up their accounts. For example, in an environment such as a university, for example, this allows administrators to give students a free print quota that they can add to as required. In addition, a print queue management can be used for manage of individual production in addition to office print queues in an office, for example.

The one or more multifunction printers 110, 112, the client device 120, and the one or more computer systems 130 can be connected via a communication network 140. The communication network 140 may include, for example, a conventional type of network, wired or wireless, and may have any number of configurations, such as a star configuration, token ring configuration, or other known configurations. The communication network 140 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, 5G, other generations), and/or any other interconnected data path across which multiple computing nodes may communicate.

Data may be transmitted in encrypted or unencrypted form between the one or more multifunction printers 110, 112, the client device 120, and the one or more computer systems 130 using a variety of different communication protocols including, for example, various Internet layer, transport layer, or application layer protocols. For example, data may be transmitted between the one or more multifunction printers 110, 112, the client device 120, and the one or more computer systems 130 via the network 140 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

In accordance with an embodiment, the user 102 can present an authenticator to one or more multifunction printers 110, 112, and/or the client device 120. The authentication of the user 102 on the one or more multifunction printers 110, 112, and the client device 120 can be via, for example, a security identification and authentication device (or authenticator), which uses automated methods of verifying or recognizing the identity of a living person based on a physiological or behavioral characteristic. Thus, the user 102 need not to manually input passwords to the one or more multifunction printers 110, 112. The method of recognizing the user 102 can include, for example, fingerprints, electrocardiogram (ECG or EKG) information, facial images, iris, and voice recognition. For example, in accordance with an exemplary embodiment, a wearable device 104, for example, a Nymi™ band, which detection of the user 102 is based on the electrocardiogram (ECG) and its unique properties, e.g., electrical activity of the heartbeat of the user (e.g., wearer) 102 can be used as an authenticator.

For example, authentication via the client device 130 can include the presentation, for example, of mobile device, smart phone, or smart watch of the user 102 to a vicinity of the authenticator (e.g., client device 120) via a near-field communication (NFC) network (e.g., Bluetooth®) and wherein the user 102 has previously been authenticated on the mobile device or smart phone by one or more of a user identifier (ID) and password and/or a biometric identifier, for example, facial recognition, fingerprint, of the like.

In accordance with an exemplary embodiment, the authentication of the user 102 on the client device 120 can be a biometric identifier, which is a distinctive, measurable characteristics used to label and describe or identify an individual, including a metric related to human characteristics. For example, the biometric identifier can include physiological characteristics of an individual including but not limited fingerprints, palm veins, face recognition, DNA (or deoxyribonucleic acid), palm print, hand geometry, iris recognition, retina, and/or odor/scent.

Figure 2:
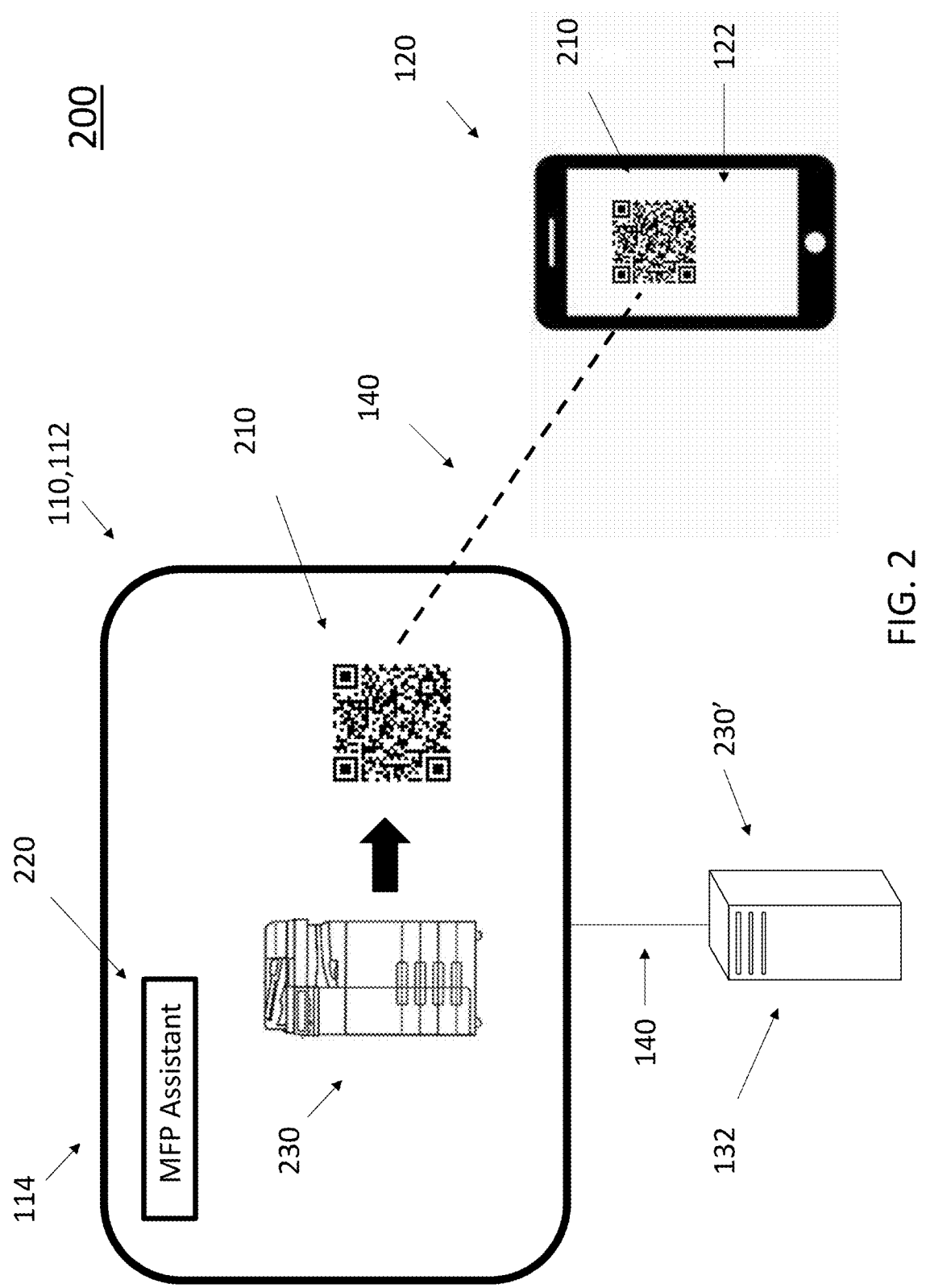
FIG. 2 is an illustration of a system that includes a mobile device configured to capture a QR code from a display of a multifunction printer to initiate a presentation of a multifunction printer operation assistant in accordance with an embodiment.

FIG. 2 is an illustration of system 200 that includes a mobile device 120 configured to capture, for example, a two-dimensional barcode or a quick response (QR) code 210 from a display 114 of a multifunction printer 110, 112 to initiate a presentation of the multifunction print operation (MFP) operation assistant application 230, 230'. The MFP operation assistant application 230 is preferably preinstalled on the multifunction printer 110, 112, or alternatively, the MFP operation assistant application 230' can be hosted on a server 132, for example, on one of the more computer systems 130. In accordance with an embodiment, in order to start the multifunction printer operation assistant application 230, 230', communication between the multifunction printer 110, 112 and the client device 120 is established. The establishment of the connection between the multifunction printer 110, 112, and the client device 120 can be, for example, via use of Near Field Communication (NFC), scanning a QR code on the display panel of the multifunction printer 110, 112, or application auto search by the client device 120 for multifunction printer 110, 112, for example, on a network or in a vicinity of the client device 120.

Once the communication is established and the access level of the user 102 is determined, the multifunction printer operation assistant application 130, 130' is ready for use. For example, a user 102 with regular access (i.e., a first level of access that is available to all of the users 102, the user 102 can select functions such as COPY, SCAN, FAX, etc. In accordance with an embodiment, the display panel 114 of the of the multifunction printer 110, 112 will displays a QR code 210, which will allow the user 102 of the client device 120 to capture the QR code. The client device 120 can use the multifunction printer operation assistant 230, 230' for COPY function, which can provide a step by step walkthrough of the complete COPY operation for the user 102 on the display panel 122 of the client device 120 of the user 102.

In accordance with an alternative embodiment, the multifunction printer 110, 112, can upon receiving a request from a user 102 via, for example, a multifunction printer assistant ("MFP Assistant") icon 220 on the display 114 of the multifunction printer 110, 112, to display a QR code 210 for downloading of the function of the multifunction printer 230, 230' onto the client device 120. The client device 120 of the user 102 can, for example, a mobile smart phone with a camera can capture an image, for example, a still picture or video of the QR code 210. In accordance with an embodiment, the QR code 210 can be an encrypted QR code, for example, a dynamic QR code (or scrambled QR code) that is changed after a certain number of retrievals.

In accordance with an embodiment, the captured QR code 210 can be displayed on a display 122 of the client device 120 and can be converted into, for example, a URL for downloading of the multifunction printer (MFP) operation assistant application 230, 230' to the client device 120 for use as disclosed herein.

Figure 3B:
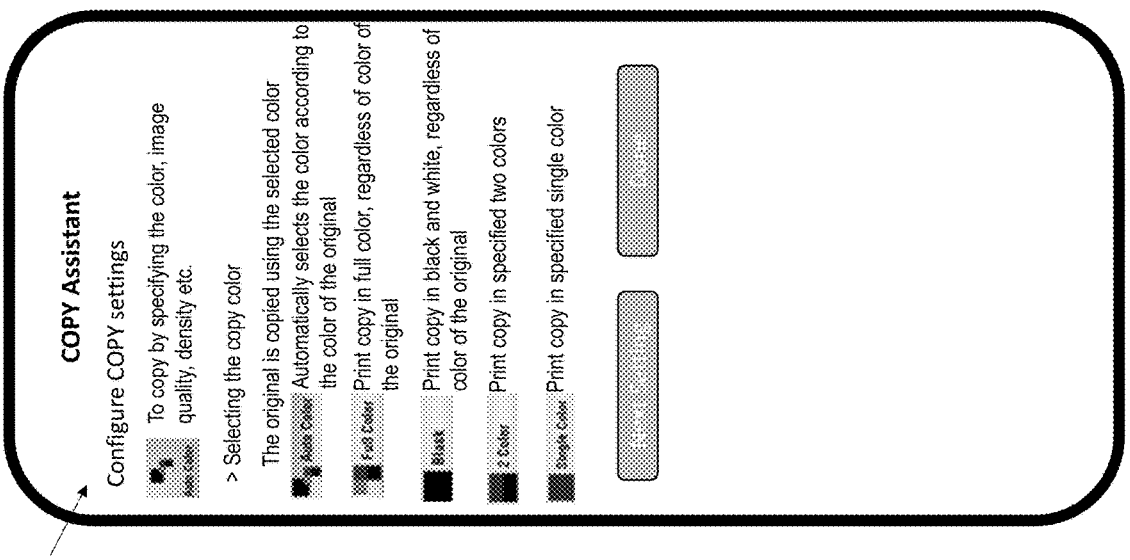
FIGS. 3A-3D are illustrations of a display of a mobile device with a copy assistant in accordance with an exemplary embodiment.
Figure 3A:
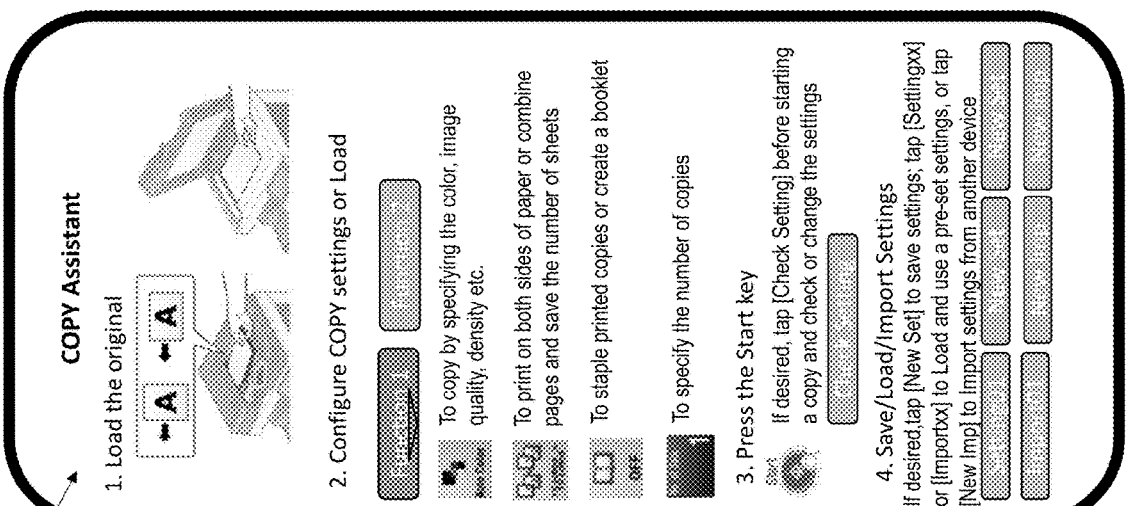

FIGS. 3A-3D are illustrations of a display 122 of a mobile device 120 with a COPY assistant in accordance with an exemplary embodiment. As shown in FIGS. 3A, the COPY Assistant feature can include a step by step explanation of the COPY process including, for example, an explanation of COPY settings or load, for example, "Function 1" and "Function 2", specifying the color, image quality, density, etc., print on both sides of paper or combine pages and save the number of sheets, to staple printed copies or create a booklet, to specify the number of copies.

Upon the selection, for example, of "To copy by specifying the color, image quality, density, etc.", as shown in FIG. 3B, the COPY Assistant feature as shown on the display panel 122 of the client device 120 can include an explanation including one or more options to "Configure COPY settings", for example, "Automatically selects the color according to the color of the original", "Print copy in full color, regardless of color of the original", "Print copy in black and white, regardless of color of the original", "Print copy in specified two colors", and "Print copy in specified single color".

Figure 3D:
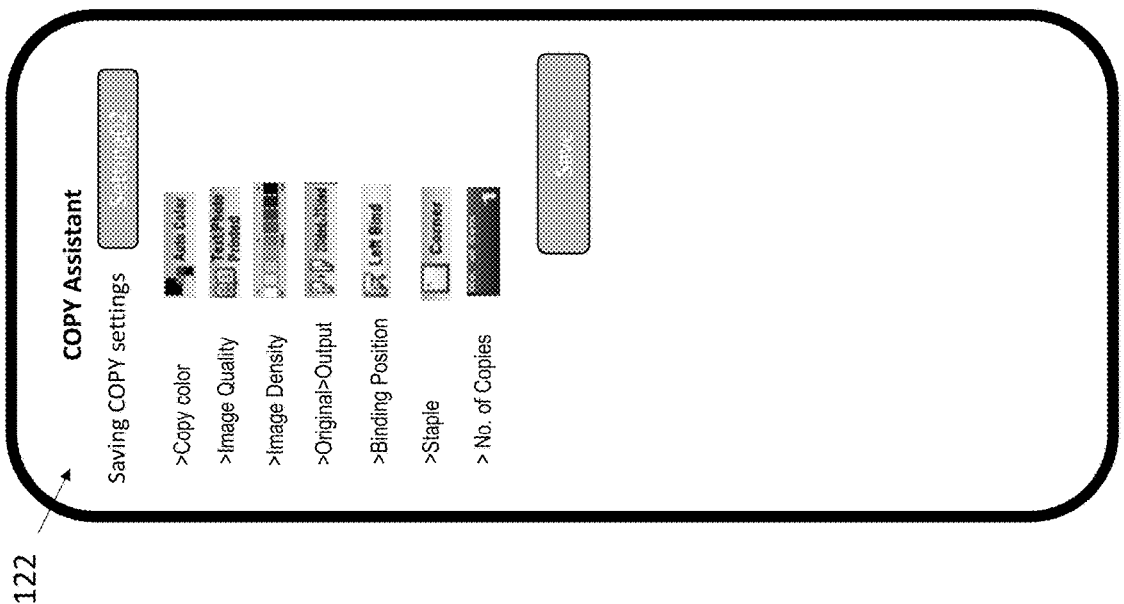
Figure 3C:
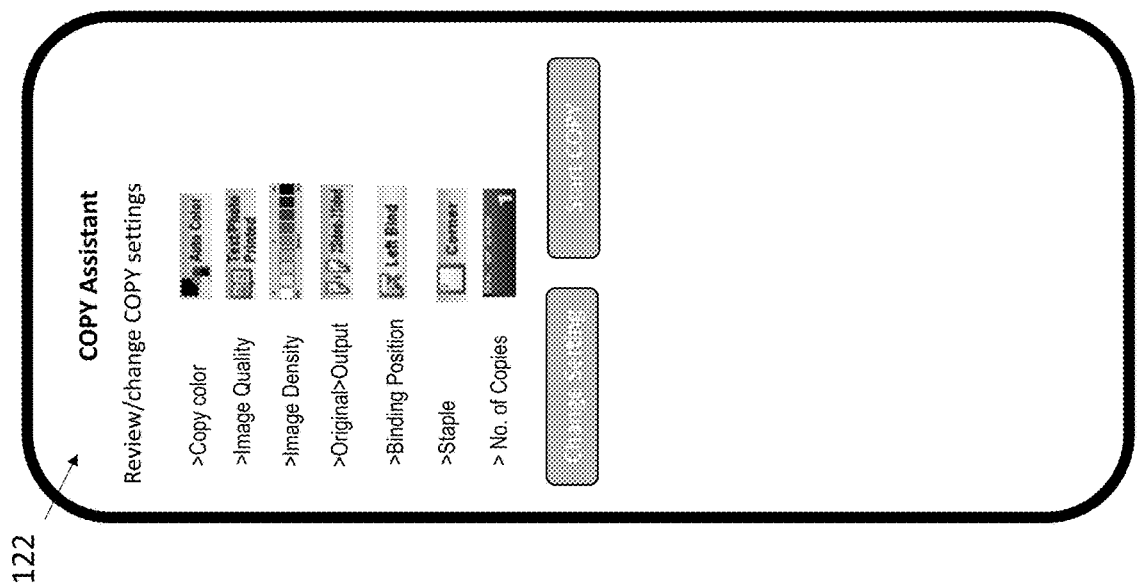

Upon the selection of, for example, "If desired, tap [Check Setting] before starting a copy and check or change the settings" as shown in FIG. 3A, in FIG. 3C, the COPY Assistant feature on the display panel 122 of the client device 120 can include a "Review/change COPY settings"

that can include, for example, "Copy color", "Image Quality", "Image Density", "Original>Output", "Staple", and "No. of Copies".

Upon the selection of, for example, "New Set" as shown in FIG. 3A, in FIG. 3D, the COPY Assistant feature on the display panel 122 of the client device 120 can include a "Saving COPY settings" that can include, for example, Copy color", "Image Quality", "Image Density", "Original>Output", "Staple", and "No. of Copies".

Figure 4D:
Figure 4D:
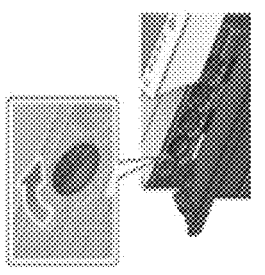
Figure 4D:

FIGS. 4A-4D are illustrations of a display of a mobile device with a Maintenance Assistant in accordance with an exemplary embodiment. As shown in FIG. 4A, the display panel 122 of the client device 120 can display in the Maintenance Assistant feature, for example, a status of one or more of Toner Cartridge, Staple Cartridge, Paper Status, Waste Toner, and Drum Unit remaining life. For example, "Toner Cartridge <YELLOW> is empty", "Toner Cartridge<BLACK> is NEAR EMPTY", "Staple Cartridge is NEAR EMPTY", Tray3 paper <Legal> is NEAR EMPTY", "Waste Toner Box is NEAR FULL", and "Drum Unit remaining life-25%".

Upon the selection, for example, of "Toner Cartridge <YELLOW> is empty in FIG. 4A, in FIG. 4B, the display panel 122 of the client device 120 can display, for example, the following instructions for Replacing Toner Cartridge <Yellow> as follows: "READ FIRST before proceeding", "NOTICE: Install a Toner Cartridge for each label color. If you try to forcibly install in the incorrect position, it may result in a failure", "WARNING: Do not throw toner cartridge into an open flame. The hot toner may scatter and cause burns or other damages", and "CAUTION: Do not force open the toner cartridge. If toner spill, take utmost care to avoid inhaling or even getting skin contact. If toner lands on your skin, wash thoroughly with soap and water." The display panel 122 of the client device 120 can also include an image of the multifunction printer 110, 112 with instructions such as, "1. Pull to open the front cover".

Figure 4C:
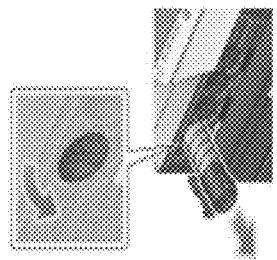
Figure 4C:
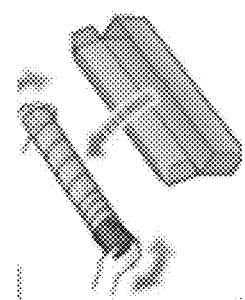
Figure 4C:
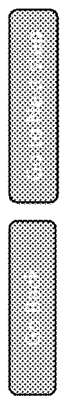

As shown in FIG. 4C, the display panel 122 of the client device 120 can provide further instructions for Replacing Toner Cartridge <Yellow> with images of the multifunction printer as follows: for "2. Turn the Yellow toner cartridge knob counterclockwise and slowly pull out", and "3. Take the toner cartridge out and shake well, approximately 5 to 10 times."

As shown in FIG. 4D, the display panel 122 of the client device 120 can provide further instructions for Replacing Toner Cartridge <Yellow> with images of the multifunction printer as follows: "5. Carefully slide the toner cartridge until it is set", and "6. Turn the cartridge knob clockwise to lock in place and close the toner cover."

Figure 5:
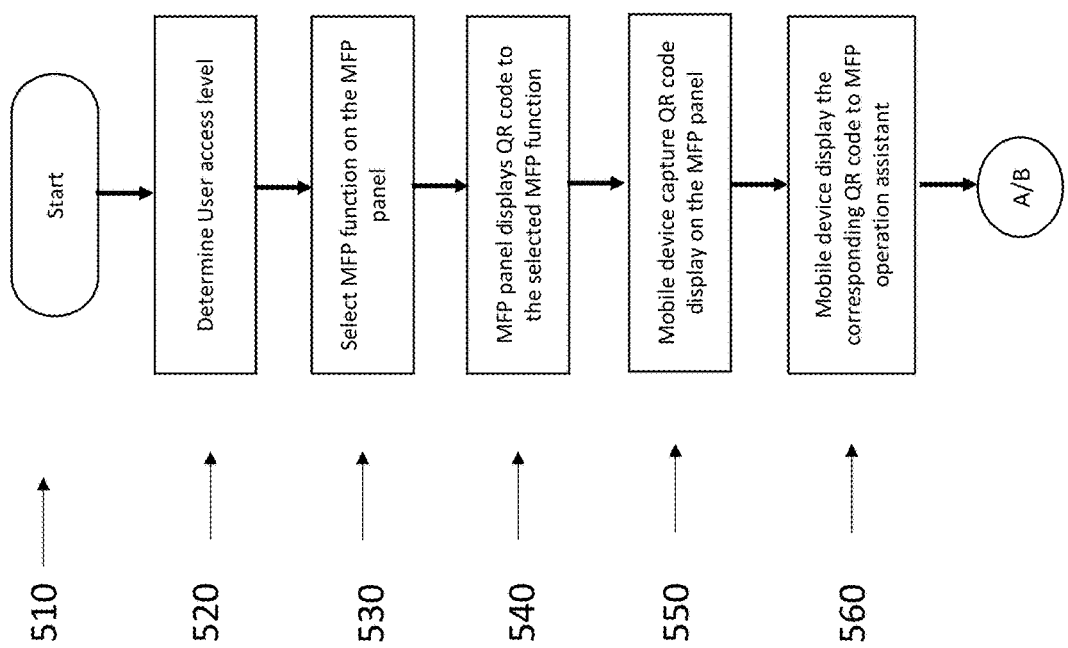
FIGS. 5-8 are flowcharts illustrating a method for operation of a multifunction printer using a mobile device in accordance with an embodiment.

FIGS. 5-8 are flowcharts 500, 600, 700, 800, illustrating a method for operation of a multifunction printer (MFP) using a mobile device in accordance with an embodiment. As shown in FIG. 5, the method for operation of a multifunction printer (MFP) 110, 112, begins in step 510. In step 520, after the user 102 has been authenticated by the multifunction printer 110, 112 via an authentication protocol, for example, by personal identification number (PIN), PKI card, or a biometric identifier, the multifunction printer 110, 112 can determine a user access level for the user 102 of the client device 120. The user access level of the user 102 can include access to one or more managed print services in addition to function of the multifunction printer 110, 112, including, for example, COPY, PRINT, SCAN, and FAX. For example, a first level access (or regular access) that each individual within a company, for example, may include all of the basic functions of the multifunction printer 110, 112. However, a second level access, for example, may be only for managers or other specific personnel can include access, for example, to different fonts, different print media, different print functions related to color printing and the like. In addition, the authentication of the user 102 can also include retrieval of any pre-set settings for functions of the multifunction printer 110, 112 that have been stored on the multifunction printer 110, 112, or stored on a server 132 that is in communication with the multifunction printer 110, 112.

In accordance with an embodiment, once the level of the user 102 of the client device has been determined by the multifunction printer 110, 112, the process continues to step 530 in which the user 102 of the client device can select a selection of a function of the multifunction printer 110, 112, which is being displayed on the display panel 114 of the multifunction printer 110, 112. For example, the display panel 114 of the multifunction printer 110, 112, can select the function of the multifunction printer 110, 112, for COPY. In step 540, the multifunction printer 110, 112, can display a code 210, for example, for the selected function of the multifunction printer 110, 112, e.g., COPY. If the user 102, for example, needs assistance with the COPY function of the multifunction printer 110, 112, the user 102 can capture the code 210 with the client device 120 of the user 102, which will provide the user 102 with an explanation (e.g., COPY Assistant) of the COPY function of the of the particular multifunction printer 110, 112 that the user 102 is wishing to perform the COPY function. For example, the multifunction printer 110, 112 may be a new multifunction printer 110, 112, for the user 102, or alternatively, the user 102 may have not used the multifunction printer 110, 112 in sometime and may have forgotten how to use the selected COPY function for the particular multifunction printer 110, 112.

In step 550, the client device 120 can capture the code 210 displayed the panel 114 of the multifunction printer 110, 112, and using a multifunction printer operation assistant application 230, 230' that has been preinstalled on the of the multifunction printer 110, 112 or available, to the of the multifunction printer 110, 112 via a server 132, and which has been downloaded to the client device 120. In accordance with an embodiment, the multifunction printer operation assistant application 230, 230' can be downloaded by the client device 120 from the multifunction printer 110, 112, from a server 132 in communication with the multifunction printer 110, 112, or from an application store. In step 560, the mobile device 120 can issue a request to the multifunction printer 110, 112 for operating assistance for the function of the multifunction printer 110, 112 based on the displayed code 210 from the client device 120.

Figure 6:
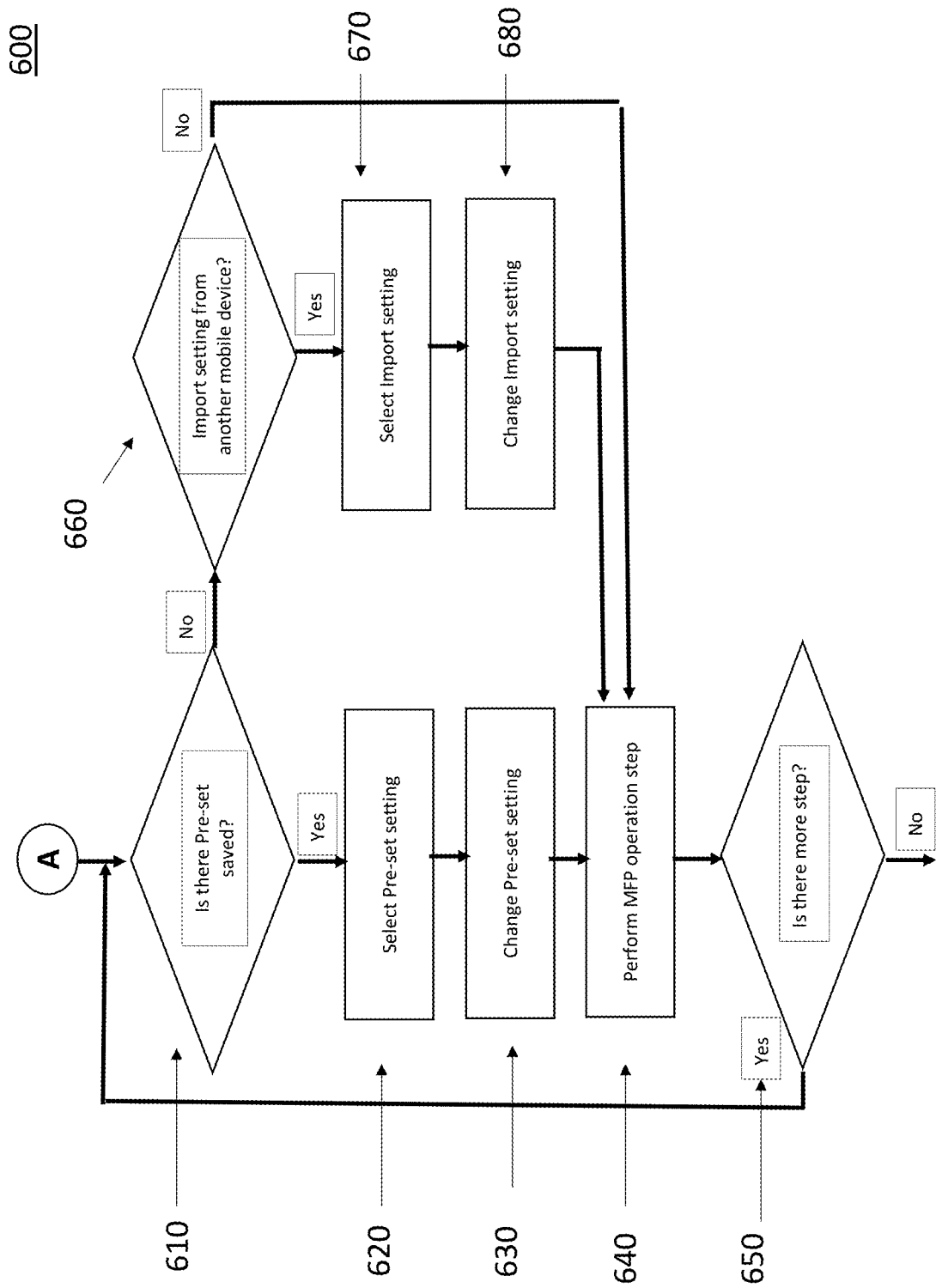

As shown in FIG. 6, in step 610, the multifunction printer 110, 112 upon receipt of request for assistance with the function of the multifunction printer 110, 112 determines if the user 102 has any pre-set settings for the function of the multifunction printer 110, 112. The pre-set settings can be stored on the multifunction printer 110, 112, stored on a server 132 in communication with the multifunction printer 110, 112, or stored on the client device 120 for the user 102, for example, as part of the multifunction printer operation assistant application. For example, if the pre-set settings are stored outside of the client device 120 of the user 102, for example, in the multifunction printer 110, 112, a server 132 that is in communication with the multifunction printer 110, 112, the multifunction printer 110, 112, can retrieve the pre-set settings for the user 102 based on authentication of the user 102 for access to the multifunction printer 110, 112.

In accordance with an embodiment, if the user 102 has pre-set settings for the function of the multifunction printer

110, 112, the process continues to step 620 in which the pre-set settings for the function of the multifunction printer 110, 112 are selected by the multifunction printer 110, 112 for the user 102. In step 630, the user 102 can change the pre-set settings for the function of the multifunction printer 110, 112, if desired. In step 640, the multifunction printer 110, 112 performs the function of the multifunction printer 110, 112, for example, a COPY function. In step 650, the multifunction printer 110, 112 determines if the function of the multifunction printer 110, 112 has one or more additional steps, for example, after the COPY function, a STAPLE function.

If the user 102 does not have any pre-set settings in step 610, the process continues to step 660 in which the user 102 can be asked if the user 102 wishes to import settings from, for example, another client device 120 (or mobile device) in which the pre-set settings, for example, of the user 102 have been stored. If the user 102 wishes to import pre-set settings from another client device 120 of the user 102, the process continues to step 670 in which the pre-set settings from the another client device 120 of the user 102, are imported into the multifunction printer 110, 112, and the user 102 is provided an opportunity to select the pre-set settings that have been imported from the another client device 120. In step 680, the user 102 can change the pre-set settings that have been imported from the another client device 120 for the user 102 for the function of the multifunction printer 110, 112. The process continues to step 640 in which the function of the multifunction printer 110, 112, for example, COPY function is performed. The process then continues to step 650 as set forth above, in which the multifunction printer 110, 112 determines if the function of the multifunction printer 110, 112 has one or more additional steps, for example, after the COPY function, a STAPLE function.

Figure 7:
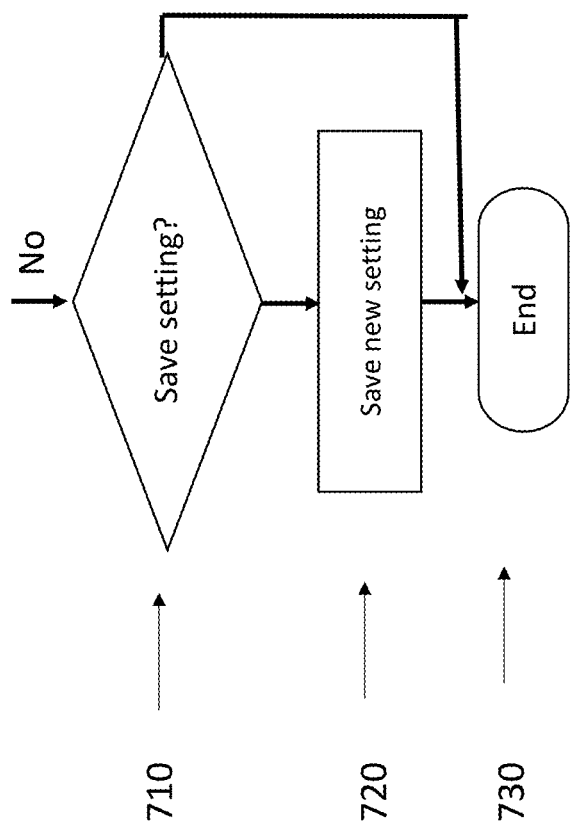

As shown in FIG. 7, if in step 650, the multifunction printer 110, 112 determines that there is no additional steps to be performed, the process continues to step 710 in which the user 102 can be given the option to save the settings for the function that was performed by the multifunction printer 110, 112 in step 640. If the user 102 wishes to save the settings for the function that was performed by the multifunction printer 110, 112 in step 640, the process continues to step 720 in which the settings are saved as a new pre-set settings. The new pre-set settings can be saved in a memory of the multifunction printer 110, 112, a memory of a server 132 in communication with the multifunction printer 110, 112, or in a memory of the client device 120. If the user 102 does not wish to save the settings for the function that was performed by the multifunction printer 110, 112 in step 640, the process continues to step 730 and the process ends. In accordance with an embodiment, rather than providing the user 102 with the option to save the pre-set settings for the function that was performed by the multifunction printer 110, 112 in step 640, the multifunction printer 110, 112, can use a machine learning algorithm to learn the settings of the user 102 and present the learned settings to the user 102 as pre-set settings.

Figure 8:
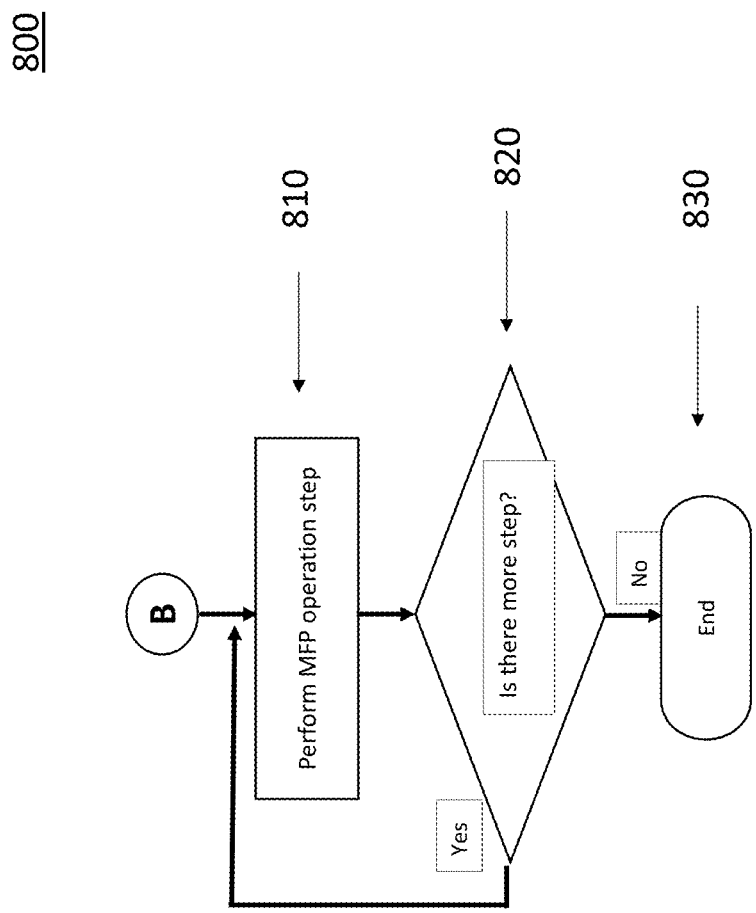

In step 560, the function of the multifunction printer 110, 112 may relate to maintenance of the multifunction printer 110, 112, for example, the toner is low or needs to be replaced, paper or print media needs to be replaced, staples need to be added, or parts need to be replaced, for example, an imaging drum unit or imaging transfer belt needs to be replaced. As shown in FIG. 8, in step 810, the multifunction printer operation assistant application can provide the client device 120 of the user with step by step directions for replacing, for example, toner as shown in FIGS. 4A-4D. In step 820, the multifunction printer 110, 112 can determine if any additional steps related to the maintenance of the multifunction printer 110, 112. If no additional steps related to the maintenance of the multifunction printer 110, 112, the process continues to step 830.

Figure 9:
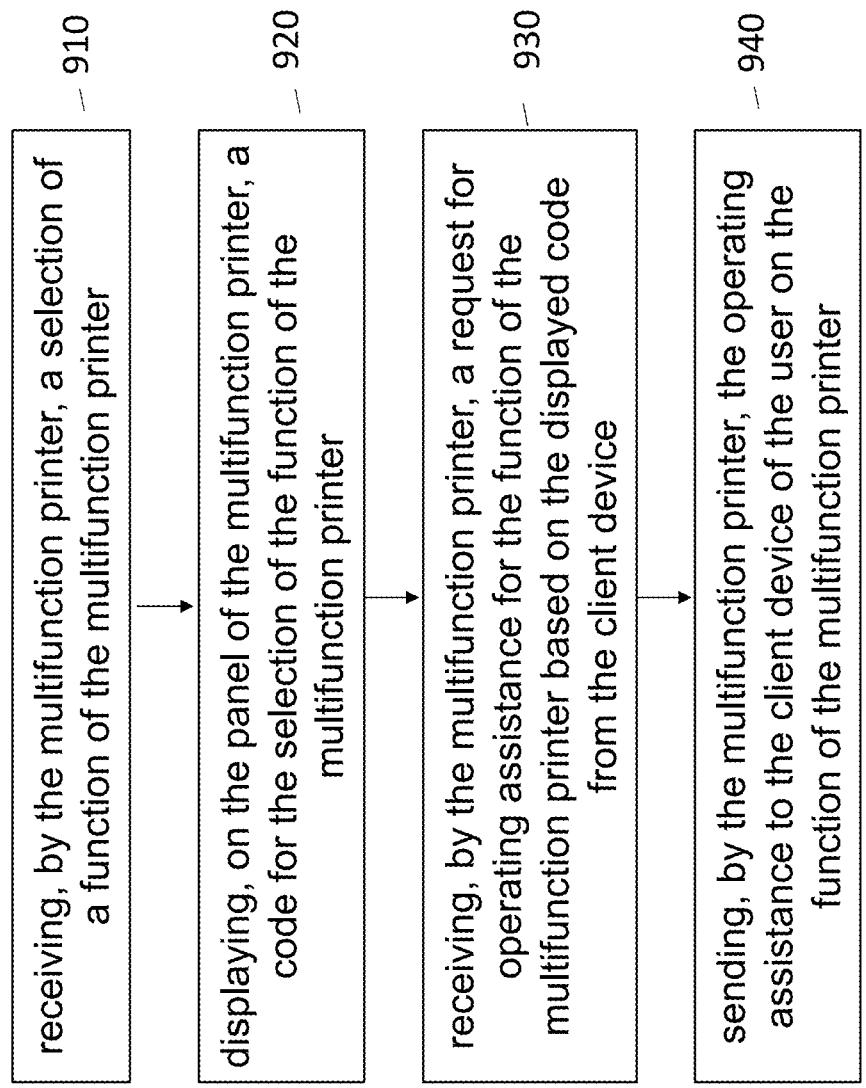
FIG. 9 is a flowchart illustrating a method for operation of a multifunction printer using a mobile device in accordance with an embodiment.

FIG. 9 is a flowchart 900 illustrating a method for operating a multifunction printer 110, 112. As shown in FIG. 9, the process starts in step 910, in which a selection of a function of the multifunction printer 110, 112 is received by the multifunction printer 110, 112. In step 920, the display panel 114 of the multifunction printer 110, 112 displays a code for the selection of the function of the multifunction printer 110, 112. In step 930, the multifunction printer 110, 112 receives a request for operating assistance for the function of the multifunction printer 110, 112 based on the displayed code from the client device 120. In step 940, the multifunction printer 110, 112 sends the operating assistance to the client device 120 of the user 102 on the function of the multifunction printer 110, 112. In accordance with an embodiment, the receiving the selection of the function of multifunction printer 110, 112 can be received from an input to a display panel on the multifunction printer 110, 112, or via, for example, a mobile print application on the client device 120 of the user 102.

In accordance with an embodiment, the method of operating of the multifunction printer 110, 112 can further include forwarding, by the multifunction printer 110, 112, a multifunction printer operation assistant application to the client device 120 of the user 102 prior to multifunction printer 110, 112 receiving the request for the operating assistance for the function of the multifunction printer 110, 112 based on the displayed code from the client device 120.

In accordance with a further embodiment, the method of operating of the multifunction printer 110, 112 can further include determining, by the multifunction printer 110, 112, if the user 102 of the client device 120 has one or more pre-set settings for the function of the multifunction printer 110, 112; receiving, by the multifunction printer 110, 112, a selection of the one or more pre-set settings for the function of the multifunction printer 110, 112 from the client device 120 of the user 102 when the user 102 of the client device 120 has the one or more pre-set settings for the function of the multifunction printer 110, 112; and executing, by the multifunction printer 110, 112, the function of the multifunction printer 110, 112 based on selection of the one or more pre-set settings. In addition, the method can include receiving, by the multifunction printer 110, 112, a request from the client device 120 to change the one or more pre-set settings selected for the function of the multifunction printer 110, 112; changing, by the multifunction printer 110, 112, the one or more pre-set settings for the function of the multifunction printer 110, 112 for the user 102 of the client device 120; and executing, by the multifunction printer 110, 112, the function of the multifunction printer 110, 112 based on change of the one or more pre-set settings.

In accordance with another embodiment, the method of operating of the multifunction printer 110, 112 can further include receiving, by the multifunction printer 110, 112, a request to import one or more pre-set settings from another client device 120 for the function of the multifunction printer 110, 112; importing, by the multifunction printer 110, 112, the one or more pre-set settings from the another client device 120 for the function of the multifunction printer 110, 112; receiving, by the multifunction printer 110, 112, a selection of the one or more pre-set settings imported from the another client device 120 for the function of the multifunction printer 110, 112; and executing, by the multifunction printer 110, 112, the function of the multifunction printer 110, 112 based on selection of the one or more pre-set settings imported from the another client device 120 for the function of the multifunction printer 110, 112. The method can also include receiving, by multifunction printer 110, 112, a request from the client device 120 of the user 102 to change the one or more pre-set settings imported from the another client device 120; changing, by the multifunction printer 110, 112, the one or more pre-set settings imported from the another client device 120 for the function of the multifunction printer 110, 112; and executing, by the multifunction printer 110, 112, the function of the multifunction printer 110, 112 based on the change of the one or more pre-set settings imported from the another client device 120 for the function of the multifunction printer 110, 112.

In accordance with a further embodiment, the method of operating of the multifunction printer 110, 112 can further include determining, by the multifunction printer 110, 112, if the user 102 of the client device 120 has one or more pre-set settings for the function of the multifunction printer 110, 112; and executing, by the multifunction printer 110, 112, the function of the multifunction printer 110, 112 based on the one or more pre-set settings for the function of the multifunction printer 110, 112. In addition, the method can include receiving, by the multifunction printer 110, 112, an instruction from the client device 120 to change one or more settings for the function of the multifunction printer 110, 112; and changing, by the multifunction printer 110, 112, the one or more pre-set settings for the function of the multifunction printer 110, 112.

In accordance with another embodiment, the method of operating of the multifunction printer 110, 112 can further include determining, by the multifunction printer 110, 112, an access level of a user 102 of the client device 120; and providing, by the multifunction printer 110, 112, the function of the multifunction printer 110, 112 to the user 102 based on the access level of the user 102 of the client device 120.

In accordance with an embodiment, the code can be quick response (QR) code, for example, a scrambled code or a dynamic QR that is changed after a certain number of retrievals. The function of the multifunction printer 110, 112 can include one or more of copy, print, scan, and fax.

In accordance with a further embodiment, the function of the multifunction printer 110, 112 can include maintenance of the multifunction printer 110, 112, the maintenance of the multifunction printer 110, 112 including one or more of toner, staples, waste toner box, a drum unit, and imaging transferring belt. In the addition, the method can further include arranging, by the multifunction printer 110, 112, for the client device 120 of the user 102 to communicate with an administrator or service person to guide the user 102 of the client device 120 through the maintenance of the multifunction printer 110, 112.

In accordance with a further embodiment, the method of operating of the multifunction printer 110, 112 can further include receiving, by the multifunction printer 110, 112, a request from the client device 120 of the user 102 to store one or more settings for the function of the multifunction printer 110, 112; and storing, by the multifunction printer 110, 112, the one or more settings for the function of the multifunction printer 110, 112 requested by the client device 120 for the user 102.

In accordance with another embodiment, the method of operating of the multifunction printer 110, 112 can further include authenticating, by the multifunction printer 110, 112, the user 102 of the client device 120 on the multifunction printer 110, 112 based on a biometric identifier for the user 102, and the biometric identifier is from a biometric authenticator device associated with one of the multifunction printer 110, 112 and the client device 120, the biometric authenticator device including one or more of a sensor, a scanning device, or an electronic reader, and wherein the biometric identifier of the user 102 being at least one physiological characteristic of the user 102, and wherein the at least one physiological characteristic is selected from one or more of fingerprints, palm veins, face recognition, DNA (deoxyribonucleic acid), palm print, hand geometry, iris recognition, retina, and/or odor/scent.

In accordance with a further embodiment, the method of operating of the multifunction printer 110, 112 can further include retrieving, by the multifunction printer 110, 112, settings for the function of the multifunction printer 110, 112 for the user 102 of the client device 120 from another multifunction printer 110, 112.

In accordance with another embodiment, the method further includes receiving, by the multifunction printer, the one or more pre-set settings from the client device in an encrypted format. The method of operating of the multifunction printer 110, 112 can also further include encrypting, by the multifunction printer 110, 112, the one or more pre-set settings for the function of the multifunction printer 110, 112.

In accordance with an embodiment, the client device 120 is a mobile device, a smart phone, or a wearable device, and the method further includes communicating, by the multifunction printer 110, 112, to the client device 120 of the user 102 via a wireless communication protocol, the wireless protocol being a near-field communication (NFC) or a Bluetooth technology standard.

Figure 10:
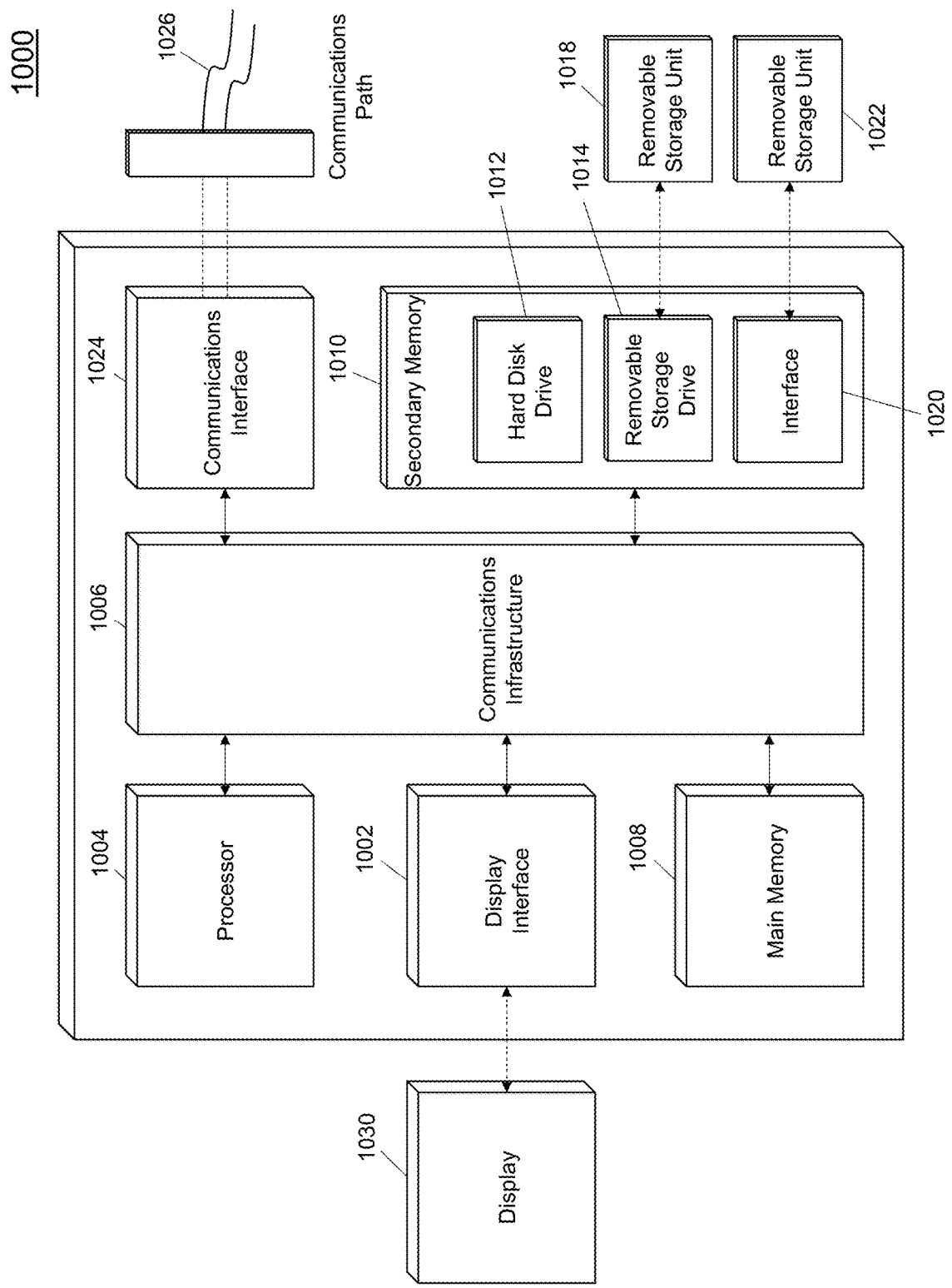
FIG. 10 is an illustration of an exemplary hardware architecture for an embodiment of a computer system.

FIG. 10 illustrates a representative computer system 1000 in which embodiments of the present disclosure, or portions thereof, may be implemented as computer-readable code executed on hardware. For example, the one or more multifunction printers 110, 112, the wearable device 104, the client device 120, and the one or more computer systems 130 associated with the method and system for operation of multifunction printers (MFPs) using a mobile device as disclosed herein may be implemented in whole or in part by a computer system 1000 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this representative computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

A processor device 1004 may be processor device specifically configured to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 1000 may further include a display interface 1002. The display interface 1002 may be configured to allow data to be transferred between the computer system 1000 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 1000, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 1008 and secondary memory 1010, which may be memory semiconductors (e.g., DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 1-9, as discussed herein. Accordingly, such computer programs may represent controllers of the computer system 1000. Where the present disclosure is implemented using software executed on hardware, the software may be stored in a computer program product and loaded into the computer system 1000 using the removable storage drive 1014, interface 1020, and hard disk drive 1012, or communications interface 1024.

The processor device 1004 may comprise one or more modules or engines configured to perform the functions of the computer system 1000. Each of the modules or engines may be implemented using hardware and, in some instances, may also utilize software executed on hardware, such as corresponding to program code and/or programs stored in the main memory 1008 or secondary memory 1010. In such instances, program code may be compiled by the processor device 1004 (e.g., by a compiling module or engine) prior to execution by the hardware of the computer system 1000. For example, the program code may be source code written in a programming language that is translated into a lower level language, such as assembly language or machine code, for execution by the processor device 1004 and/or any additional hardware components of the computer system 1000. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1000 to perform the functions disclosed herein. It will be apparent to persons having skill in the relevant art that such processes result in the computer system 1000 being a specially configured computer system 1000 uniquely programmed to perform the functions discussed above.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of operating a multifunction printer, the method comprising:
   authenticating, by the multifunction printer, a user via an authentication protocol;
   determining, by the multifunction printer, an access level of the authenticated user, the access level of the authenticated user including access of the authenticated user to one or more functions of the multifunction printer and managed print services of the multifunction printer;
   receiving, by a display panel of the multifunction printer, a selection of a function of the multifunction printer based on the access level of the authenticated user;
   receiving, by the display panel of the multifunction printer, a request from the authenticated user via a multifunction printer assistant icon on the display panel of the multifunction printer for a code for operating assistance for the selection of the function of the multifunction printer, the code for operating assistance based on the access level of the authenticated user;
   displaying, on the display panel of the multifunction printer, the code to initiate operating assistance for the selection of the function of the multifunction printer based on the access level of the authenticated user;
   receiving, by the multifunction printer, a request based on the displayed code from a client device of the authenticated user for the operating assistance for the function of the multifunction printer based on the access level of the authenticated user; and
   sending, by the multifunction printer, the operating assistance to the client device of the authenticated user on the function of the multifunction printer based on the access level of the authenticated user.

2. The method according to claim 1, further comprising:
   forwarding, by the multifunction printer, a multifunction printer operation assistant application to the client device of the authenticated user prior to the multifunction printer receiving the request for the operating assistance for the function of the multifunction printer based on the displayed code from the client device.

3. The method according to claim 1, further comprising:
   determining, by the multifunction printer, if the authenticated user of the client device has one or more pre-set settings for the function of the multifunction printer;
   receiving, by the multifunction printer, a selection of the one or more pre-set settings for the function of the multifunction printer from the client device of the authenticated user when the authenticated user of the client device has the one or more pre-set settings for the function of the multifunction printer; and
   executing, by the multifunction printer, the function of the multifunction printer based on selection of the one or more pre-set settings.

4. The method according to claim 3, further comprising:
   receiving, by the multifunction printer, a request from the client device to change the one or more pre-set settings selected for the function of the multifunction printer;
   changing, by the multifunction printer, the one or more pre-set settings for the function of the multifunction printer for the authenticated user of the client device based on the access level of the authenticated user; and
   executing, by the multifunction printer, the function of the multifunction printer based on change of the one or more pre-set settings.

5. The method according to claim 3, further comprising:
   receiving, by the multifunction printer, the one or more pre-set settings from the client device in an encrypted format.

6. The method according to claim 1, further comprising:
   receiving, by the multifunction printer, a request to import one or more pre-set settings from another client device for the function of the multifunction printer;
   importing, by the multifunction printer, the one or more pre-set settings from the another client device for the function of the multifunction printer based on the access level of the authenticated user;
   receiving, by the multifunction printer, a selection of the one or more pre-set settings imported from the another client device for the function of the multifunction printer; and
   executing, by the multifunction printer, the function of the multifunction printer based on selection of the one or more pre-set settings imported from the another client device for the function of the multifunction printer.

7. The method according to claim 6, further comprising:
receiving, by multifunction printer, a request from the client device of the authenticated user to change the one or more pre-set settings imported from the another client device;
changing, by the multifunction printer, the one or more pre-set settings imported from the another client device for the function of the multifunction printer based on the access level of the authenticated user; and
executing, by the multifunction printer, the function of the multifunction printer based on the change of the one or more pre-set settings imported from the another client device for the function of the multifunction printer.

8. The method according to claim 1, further comprising:
determining, by the multifunction printer, if the authenticated user of the client device has one or more pre-set settings for the function of the multifunction printer; and
executing, by the multifunction printer, the function of the multifunction printer based on the one or more pre-set settings for the function of the multifunction printer.

9. The method according to claim 8, further comprising:
receiving, by the multifunction printer, an instruction from the client device to change one or more settings for the function of the multifunction printer; and
changing, by the multifunction printer, the one or more pre-set settings for the function of the multifunction printer.

10. The method according to claim 1, wherein the code is quick response (QR) code.

11. The method according to claim 10, wherein the QR code is a dynamic QR that is changed after a certain number of retrievals.

12. The method according to claim 1, wherein the function of the multifunction printer is one or more of copy, print, scan, and fax.

13. The method according to claim 1, wherein the function of the multifunction printer includes maintenance of the multifunction printer, the maintenance of the multifunction printer including one or more of toner, staples, waste toner box, a drum unit, and imaging transferring belt, and the method further comprises:
arranging, by the multifunction printer, for the client device of the authenticated user to communicate with an administrator or service person to guide the authenticated user of the client device through the maintenance of the multifunction printer.

14. The method according to claim 1, further comprising:
receiving, by the multifunction printer, a request from the client device of the authenticated user to store one or more settings for the function of the multifunction printer; and
storing, by the multifunction printer, the one or more settings for the function of the multifunction printer requested by the client device for the authenticated user based on the access level of the authenticated user.

15. The method according to claim 1, wherein the authentical protocol is a biometric identifier for the authenticated user, and wherein the biometric identifier is from a biometric authenticator device associated with one of the multifunction printer and the client device, the biometric authenticator device including one or more of a sensor, a scanning device, or an electronic reader, and wherein the biometric identifier of the authenticated user being at least one physiological characteristic of the authenticated user, and wherein the at least one physiological characteristic is selected from one or more of fingerprints, palm veins, face recognition, DNA (deoxyribonucleic acid), palm print, hand geometry, iris recognition, retina, and/or odor/scent.

16. The method according to claim 1, further comprising:
retrieving, by the multifunction printer, settings for the function of the multifunction printer for the authenticated user of the client device from another multifunction printer.

17. The method according to claim 1, wherein the client device is a mobile device, a smart phone, or a wearable device, and wherein the method further comprises:
communicating, by the multifunction printer, to the client device of the authenticated user via a wireless communication protocol, the wireless protocol being a near-field communication (NFC) or a Bluetooth technology standard.

18. A non-transitory computer-readable medium having program instructions embodied therewith, the program instructions executable by a computer to cause the computer to perform a process comprising:
authenticating, by the multifunction printer, a user via an authentication protocol;
determining, by the multifunction printer, an access level of the authenticated user, the access level of the authenticated user including access of the authenticated user to one or more functions of the multifunction printer and managed print services of the multifunction printer;
receiving, by a display panel of the multifunction printer, a selection of a function of the multifunction printer based on the access level of the authenticated user;
receiving, by the display panel of the multifunction printer, a request from the authenticated user via a multifunction printer assistant icon on the display panel of the multifunction printer for a code for operating assistance for the selection of the function of the multifunction printer, the code for operating assistance based on the access level of the authenticated user;
displaying, on the display panel of the multifunction printer, the code to initiate operating assistance for the selection of the function of the multifunction printer based on the access level of the authenticated user;
receiving, by the multifunction printer, a request based on the displayed code from a client device of the authenticated user for the operating assistance for the function of the multifunction printer based on the access level of the authenticated user; and
sending, by the multifunction printer, the operating assistance to the client device of the authenticated user on the function of the multifunction printer based on the access level of the authenticated user.

19. The non-transitory computer-readable medium according to claim 18, further comprising:
forwarding, by the multifunction printer, a multifunction printer operation assistant application to the client device of the authenticated user prior to the multifunction printer receiving the request for the operating assistance for the function of the multifunction printer based on the displayed code from the client device.

20. A multifunction printer comprising:
a display panel; and
a processor configured to:
authenticate a user via an authentication protocol;
determine an access level of the authenticated user, the access level of the authenticated user including access of the authenticated user to one or more functions of the multifunction printer and managed print services of the multifunction printer;

receive a selection of a function on the display panel of the multifunction printer based on the access level of the authenticated user;

receive a request from the authenticated user via a multifunction printer assistant icon on the display panel of the multifunction printer for a code for operating assistance for the selection of the function of the multifunction printer, the code for operating assistance based on the access level of the authenticated user;

display, on the display panel of the multifunction printer, the code to initiate operating assistance for the selection of the function of the multifunction printer based on the access level of the authenticated user;

receive a request based on the displayed code from a client device of the authenticated user for the operating assistance for the function of the multifunction printer based on the access level of the authenticated user; and send the operating assistance to the client device of the authenticated user on the function of the multifunction printer based on the access level of the authenticated user.

* * * * *